Jan. 30, 1934.   L. J. DAVIS   1,945,261
DETACHABLE TRACTION RIM FOR AUTOMOBILES
Filed Jan. 7, 1933   2 Sheets-Sheet 1
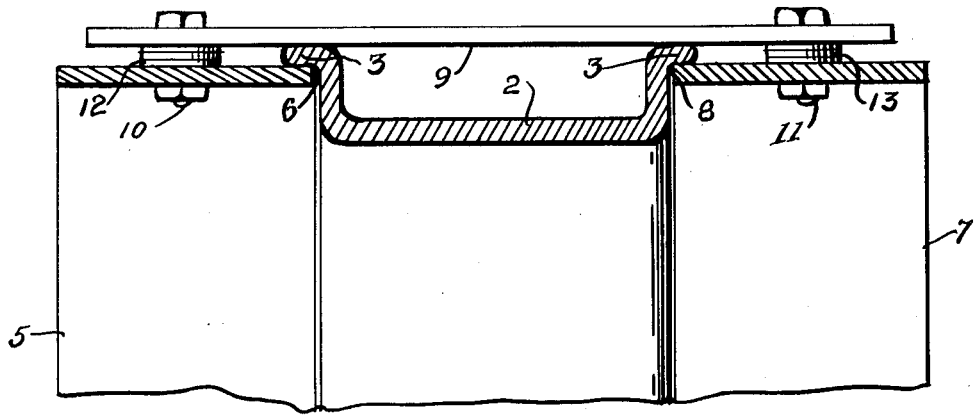
FIGURE 3
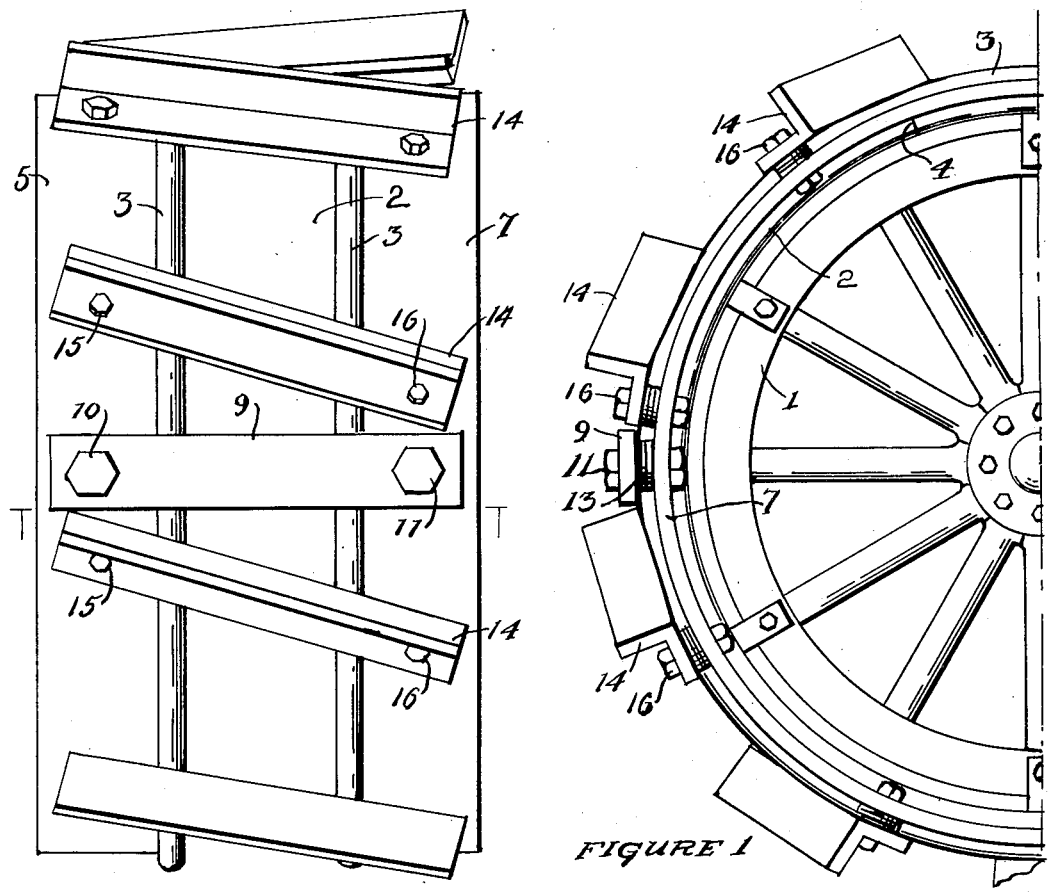
FIGURE 2
FIGURE 1
INVENTOR
Lewis J. Davis
John A. Naismith
ATTORNEY Jan. 30, 1934.  L. J. DAVIS  1,945,261
DETACHABLE TRACTION RIM FOR AUTOMOBILES
Filed Jan. 7, 1933  2 Sheets-Sheet 2

INVENTOR
Lewis J. Davis
John A. Naismith
ATTORNEY

Patented Jan. 30, 1934

1,945,261

UNITED STATES PATENT OFFICE 1,945,261

DETACHABLE TRACTION RIM FOR AUTOMOBILES

Lewis J. Davis, San Jose, Calif.

Application January 7, 1933. Serial No. 650,638

4 Claims. (Cl. 301—40)

In the operation of small farms, ranches, and other properties, it is more or less frequently necessary to haul a load over, or perform work upon, ground that is too soft to afford the required traction for an ordinary automobile wheel, and yet in most of such cases a tractor is not available.

It is one object of my invention, therefore, to provide means whereby the ordinary pneumatic tired automobile wheel may be quickly and easily transformed into one that will present adequate traction surface to properly support the load on soft ground and to provide a positive driving contact therewith.

It is another object of the invention to provide a means of the character indicated wherein the rim itself forms the basic part of the new wheel structure, thereby economizing in labor, weight and material.

It is also an object of the invention to provide means of the character indicated that will be economical to manufacture, simple in form and construction, of few parts, quickly and easily assembled and disassembled, strong, durable, and highly efficient in its practical application.

In the drawings:

Figure 1 is a side elevation of a portion of a wheel embodying my invention.

Figure 2 is an edge elevation of a wheel embodying the invention.

Figure 3 is an enlarged section on line 3—3 of Figure 2.

Figure 4:
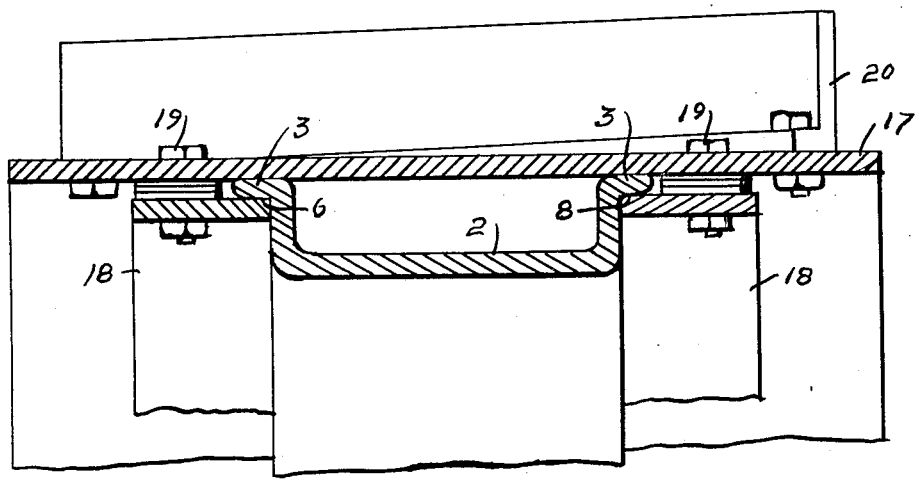
Figure 4 is a transverse sectional view through a portion of another embodiment of the invention.

The present invention is applied to any form of wheel as 1 carrying a rim 2 provided with outwardly turned peripheral flanges as 3. The rim 2 is of the collapsible type and is split at 4. In equipping the wheel in accordance with my invention the pneumatic tire is first removed, and consequently is not shown.

At 5 is shown an annulus concentrically disposed relative to the axis of the wheel, and of such a size as to fit snugly in the shoulder 6 formed by the one flange 3. A second annulus 7 is similarly disposed upon the opposite side of the wheel to fit in the shoulder 8 formed by the other flange 3.

At 9 is shown a bar overlying the rim and disposed crosswise thereof and secured to annulus 5 by means of a bolt 10, and to annulus 7 by a bolt 11.

Washers as 12—13 are inserted between each end of bar 9 and the underlying annulus as desired, but these parts are so spaced that when the bolts are tight each annulus is clamped tightly in position on the adjacent rim flange. These tie-bars are disposed about the periphery of the wheel in any number to positively bind the parts 2, 5 and 7 into one integral whole.

The members 5 and 7 may, of course, be of any desired width, and they may be quickly removed from the rim 2 by merely removing one set of bolts, the combined widths of the two members 5 and 7 being only the difference between the total desired width of the wheel and the width of the rim 2.

As herein disclosed I show at 14 a number of grousers, each grouser being bolted to members 5 and 7 by means of bolts as 15—16. Each of these grousers is angularly disposed relative to tie-bars 9 and is clamped down tightly upon the rim 2 by the said bolts as described.

By means of this construction one set of bolts as 10 may be removed to disengage the bars 9 from one member, as 5, and then the whole structure may be removed from the rim by merely rotating one member, as 5, a little, relative to the other member 7, thereby causing the grousers 14 to spread the members 5 and 7 apart and allowing the rim 2 to be collapsed and removed.

In the embodiment shown in Figure 4 a wide traction rim 17 encircles the detachable rim 2 and overlies the flanges 3 and is secured in position by annuli 18 seated in shoulders 6 and 8 and clamped to the annuli by bolts as 19. Grousers as 20 are mounted thereon.

Figure 5:
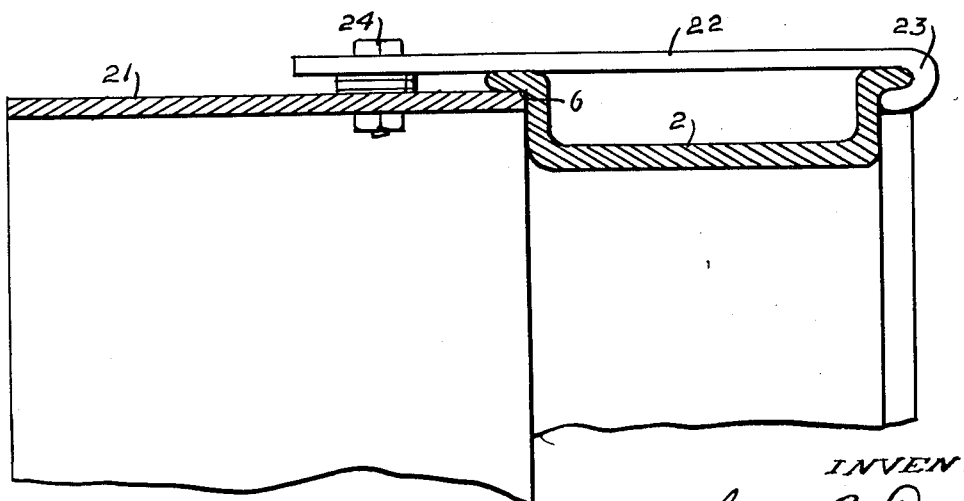
Figure 5 is a transverse sectional view through a portion of still another embodiment of the invention.

In the embodiment shown in Figure 5 a single wide traction rim 21 is seated in one shoulder as 6 of rim 2, and is secured in position by clamping bars as 22 provided with a hook at one end as 23 to engage the one flange 3 and extending over the other flange and bolted to the rim 21 as at 24.

It is to be understood, of course, that while I have herein shown and described certain specific embodiments of the invention, changes in form, construction, and method of assembly may be made within the scope of the appended claims.

I claim:

1. The combination of a wheel rim having outwardly and axially turned peripheral flanges forming shoulders with the rim, an annulus seated in the shoulder formed by each flange and in concentric relation to the rim, bars overlying the rim and both annuli in parallel relation to the axis of the rim, and means binding each end of the bar to the adjacent annulus to hold it in the shoulder.

2. In combination, a wheel rim having outwardly and axially turned peripheral flanges forming shoulders with the rim, an annulus seated in the shoulder formed by each flange, and clamping means secured to each annulus and overlying the flanges to clamp each annulus to the rim.

3. In combination, a wheel rim having outwardly and axially turned peripheral flanges forming shoulders with the rim, an annulus seated in the shoulder formed by each flange, clamping means overlying the rim in parallel relation to the axis of the rim and secured at its ends to each annulus whereby to clamp the same in position, and grousers overlying the rim in angular relation to the clamping means and removably attached at their ends to each annulus.

4. The combination with a detachable rim for pneumatic tired wheels provided with outwardly and axially turned peripheral flanges forming shoulders with the rim, of a traction rim seated in the shoulder formed by one of said flanges, and means engaging the other of said flanges and overlying both flanges and the traction rim, and clamping means for binding the last mentioned means and traction rim to the adjacent flange.

LEWIS J. DAVIS.